US010555173B2

(12) United States Patent
Zhuang et al.

(10) Patent No.: US 10,555,173 B2
(45) Date of Patent: Feb. 4, 2020

(54) PAIRING AUTHENTICATION METHOD FOR ELECTRONIC TRANSACTION DEVICE

(71) Applicant: CoolBitX Ltd., Grand Cayman (KY)

(72) Inventors: Jay Zhuang, Taipei (TW); Shih Mai Ou, Taipei (TW)

(73) Assignee: COOLBITX LTD., Grand Cayman (KY)

( * ) Notice: Subject to any disclaimer, the term of this patent is extended or adjusted under 35 U.S.C. 154(b) by 219 days.

(21) Appl. No.: 15/893,578

(22) Filed: Feb. 9, 2018

(65) Prior Publication Data

US 2019/0253890 A1 Aug. 15, 2019

(51) Int. Cl.
*H04W 12/06* (2009.01)
*H04W 12/04* (2009.01)
*G06K 7/10* (2006.01)
*H04L 9/30* (2006.01)
*G06F 8/61* (2018.01)

(52) U.S. Cl.
CPC ........ *H04W 12/06* (2013.01); *G06K 7/10009* (2013.01); *H04L 9/30* (2013.01); *H04W 12/04* (2013.01); *G06F 8/61* (2013.01)

(58) Field of Classification Search
CPC ........ H04W 12/06; H04W 12/04; H04L 9/30; H04L 9/3226; H04L 2209/805; G06K 7/10009; G06F 8/61
See application file for complete search history.

(56) References Cited

U.S. PATENT DOCUMENTS

| 6,003,014 A | * | 12/1999 | Lee | G06Q 20/105 705/13 |
| 6,018,717 A | * | 1/2000 | Lee | G06Q 20/105 705/13 |
| 6,749,115 B2 | * | 6/2004 | Gressel | G06F 21/57 235/382 |
| 7,374,079 B2 | * | 5/2008 | Nam | G06Q 20/04 235/379 |
| 9,262,594 B2 | * | 2/2016 | Lange | G06F 21/10 |
| 9,848,326 B2 | * | 12/2017 | Gu | H04W 12/06 |
| 2016/0267486 A1 | * | 9/2016 | Mitra | G06Q 20/40145 |

* cited by examiner

*Primary Examiner* — Christopher A Revak
(74) *Attorney, Agent, or Firm* — Rabin & Berdo, P.C.

(57) ABSTRACT

A pairing authentication method includes the steps of installing application software on first and second electronic devices to create first and second public keys thereon, respectively; connecting the first electronic device to a closed storage device for the former to generate a checking key; storing the first public and the checking key on a security chip of the closed storage device; connecting the second electronic device to the closed storage device for the former to generate an authorization key that matches the checking key, and transmitting the second public and the authorization key to the closed storage device; and the closed storage device verifying the authorization key matches the checking key and storing the second public key on the security chip. Therefore, only a cardholder knowing the checking key can use the closed storage device and no risk of asset theft exists if the closed storage device was lost.

7 Claims, 11 Drawing Sheets

US 10,555,173 B2

PAIRING AUTHENTICATION METHOD FOR ELECTRONIC TRANSACTION DEVICE

FIELD OF THE INVENTION

The present invention relates to a pairing authentication method for electronic transaction device; and more particularly, to a pairing authentication method in which an electronic device is connected to a closed storage device and generates a checking key, which is known only by a cardholder.

BACKGROUND OF THE INVENTION

Following the technological advancements, many conventional manners of transactions and payments are gradually replaced by integrated circuit (IC) cards. A cardholder's data can be stored on a memory in the IC card, enabling the IC card to be widely used for different purposes. Among others, ATM (automated teller machine) cards, financial cards, credit cards, public phone calling cards and stored-value cards are now very common IC cards. Generally, according to the data access manners, IC cards can be divided into contact IC cards, contactless IC cards and hybrid IC cards.

For example, when using a financial card that has the functions of both credit card and ATM card to make a transaction or get a service through an ATM, the cardholder has to first enter a preset password to get the right to use the financial card. Anyone who found or stole someone else's financial card and did know the password would not be able to draw cash through an ATM using the card. However, someone who stole or found a financial card can make payment using the card simply by forging the cardholder's signature to cause financial losses to the cardholder.

Meanwhile, as a result of the constantly improved wireless communication technologies, some of the IC cards have also employed the wireless communication technology of radio-frequency identification (RFID) and are most frequently used when making small-amount purchases or transactions. For example, an easy card can be used when taking bus, mass rapid transit or other public transportation means and the fares are deducted from the card when the card is passed over a contactless sensor. To enable time-saving and convenient transaction, the small-amount purchases using such IC cards do not require the consumers or cardholders to enter a password or to sign a receipt. Therefore, anyone who stole or found an IC card that can be used to make purchases simply via wireless sensing can directly use the card to make purchases or other transactions until the card is cancelled or runs out of cash.

There are also access control IC cards. To enable quick and convenient entry, a person who holds a correct access control IC card is allowed to enter or leave an access controlled area. Therefore, anyone who stole or found an access control IC card can directly use the same to gain access to a premise.

SUMMARY OF THE INVENTION

A primary object of the present invention is to provide a pairing authentication method, according to which an electronic device connected to a closed storage device can generate a secret key that is known only by a cardholder, namely, the holder of the closed storage device, so that only a cardholder who has input the correct secret key can use the closed storage device to make any transaction. And, in the event the closed storage device is stolen or lost, anyone who stole or found the closed storage device and didn't know the secret key would not have any chance to use it. Therefore, any theft of information and/or digital or currency assets stored on the stolen or lost closed storage device can be avoided.

To achieve the above and other objects, the pairing authentication method according to the present invention includes the following steps.

Install a piece of application software on a first and a second electronic device, so that a first public key and a second public key are generated for the first and the second electronic device, respectively; cause the first electronic device to search a closed storage device and connect to the closed storage device; further cause the first electronic device to examine a security chip of the closed storage device to verify that the security chip is currently in an authorization state and has not any public key stored thereon; and then cause the first electronic device to generate a checking key.

Cause the first electronic device to transmit the first public key and the checking key to the closed storage device for storing on the security chip, so that the security chip is changed from the authorization state into a restriction state having a public key stored thereon when the first public key and the checking key have been stored thereon. According to the first public key, the security chip generates a first identification message corresponding to the application software installed on the first electronic device after the first public key is stored on the security chip, and the closed storage device further transmits the first identification message to the first electronic device. And then, cause a microprocessor of the closed storage device to generate a log-in request message when the closed storage device receives the first public key and the checking key, and further cause an operating unit of the closed storage device to generate and transmit an execution confirmation message to the microprocessor; so that the microprocessor generates an execute log-in message according to the log-in request message for the security chip to store the first public key and the checking key thereon.

Cause the second electronic device to search the closed storage device and establish a connection to the closed storage device; further cause the second electronic device to examine the security chip and verify the security chip is currently in the restriction state; and then cause the security chip to generate and transmit a request message to the second electronic device. According to the request message, the second electronic device obtains an authorization key and transmits the second public key and the authorization key to the closed storage device.

Finally, the closed storage device stores the second public key thereon when it verifies the authorization key matches the checking key. Then, after the second public key is stored on the security chip, the security chip generates a second identification message corresponding to the application software installed on the second electronic device according to the second public key, and the closed storage device transmits the second identification message to the second electronic device. Further, the microprocessor of the closed storage device first generates a pairing verification message before the closed storage device starts verifying the authorization key matches the checking key. Then, use the operating unit on the closed storage device to generate and transmit an authorization confirmation message to the microprocessor, so that the microprocessor generates an authorization consented message according to the pairing verification message and transmits the authorization consented message to the security chip to complete the verifying of the authorization key and the checking key by the closed storage device.

In the event the closed storage device verifies that the authorization key does not match the checking key, the security chip refuses to store the second public key thereon; and one of the first and the second electronic device generates a reset message via the application software installed thereon and transmits the reset message to the closed storage device to change the security chip from the restriction state into the authorization state again. Before the security chip is changed from the restriction state into the authorization state again, the microprocessor of the closed storage device first generates a reset request message according to the reset message, and the operating unit on the closed storage device generates and transmits a reset confirmation message to the microprocessor, so that the microprocessor generates an execute reset message according to the reset request message and transmits the execute reset message to the security chip, enabling the security chip to change from the restriction state to the authorization state again.

The method of the present invention is characterized in that the first electronic device will generate the first public key and the checking key for storing on the security chip of the closed storage device when the first electronic device has a piece of application software installed thereon and is connected to the closed storage device, so that the security chip is changed from an authorized state having not any public key installed thereon into a restriction state having a public key installed thereon; and that the second electronic device has to generate an authorization key matching the checking key and transmit the authorization key and the second public key to the security chip for storing thereon before it can use the closed storage device. In the event the closed storage device is stolen or lost, anyone who stole or found the closed storage device and didn't know the checking key would not have any chance to use it. Therefore, any theft of information and/or digital or currency assets stored on the stolen or lost closed storage device can be avoided.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
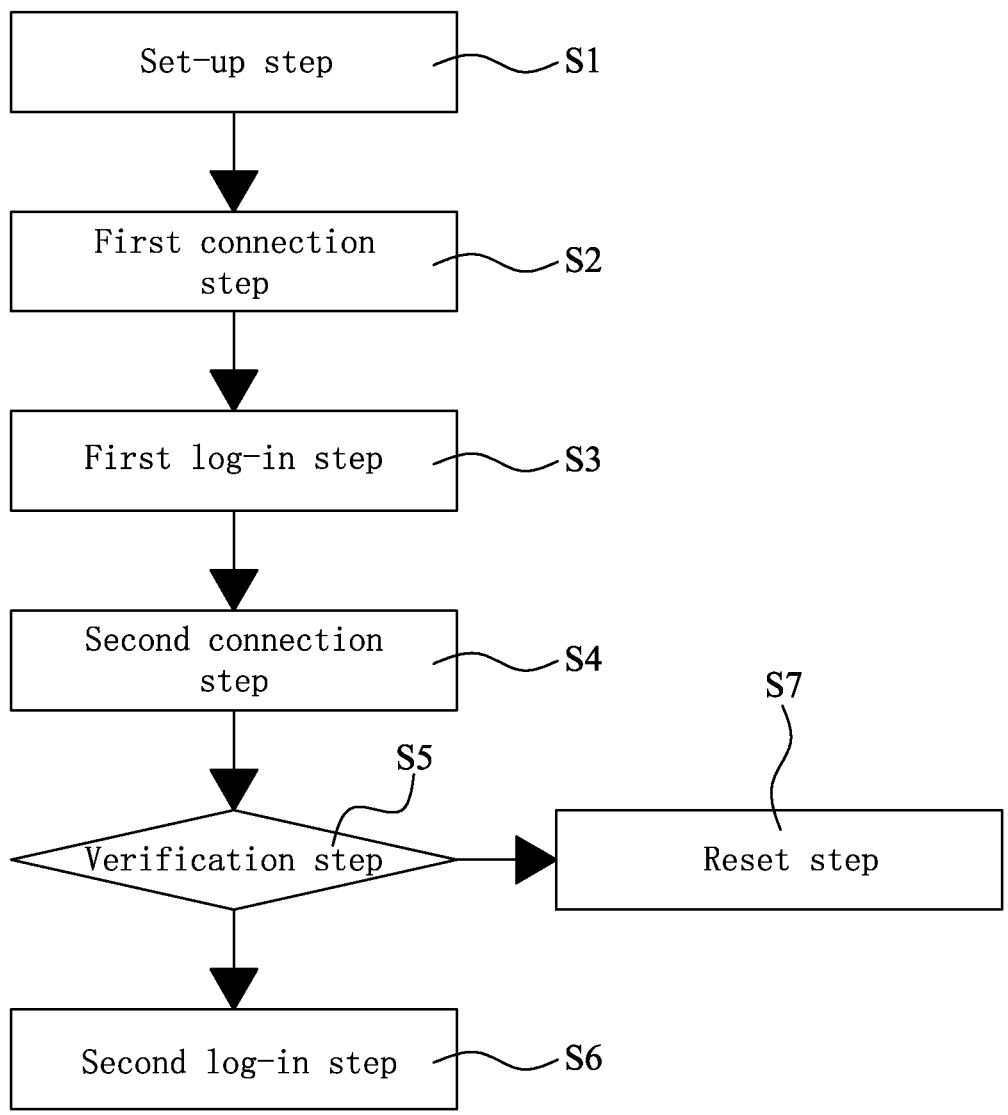
FIG. 1 is a flowchart showing the steps included in a pairing authentication method according to a preferred embodiment of the present invention.
Figure 2:
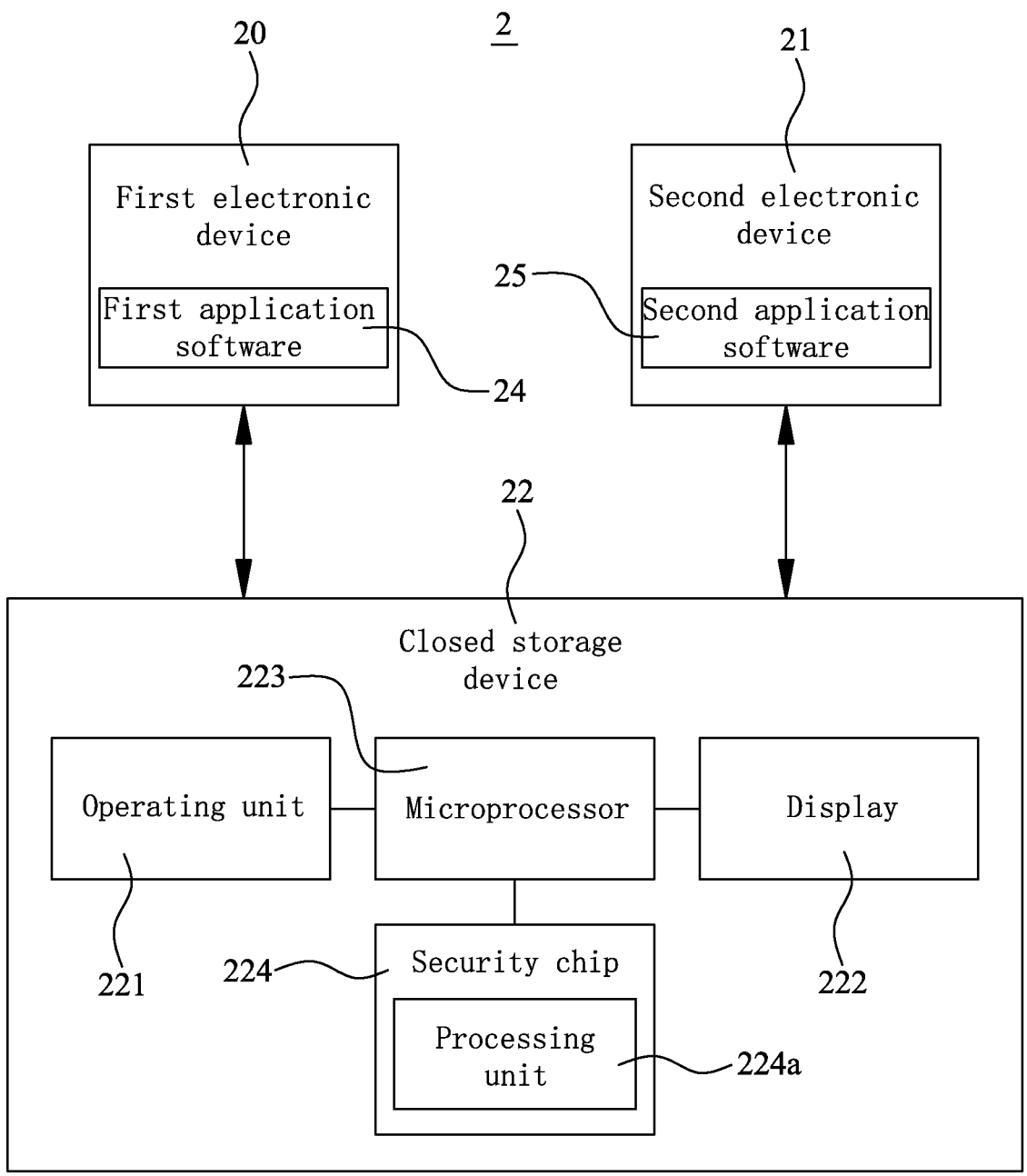
FIG. 2 is a modular view of a pairing authentication system for use with the pairing authentication method of the present invention.

Please refer to FIG. 1 that is a flowchart showing steps included in a pairing authentication method 1 according to a preferred embodiment of the present invention, and to FIG. 2 that is a modular view of a pairing authentication system 2 for use with the pairing authentication method 1. The pairing authentication method 1 is designed for an electronic transaction device, such as a closed storage device. The pairing authentication system 2 includes a first electronic device 20, a second electronic device 21 and a closed storage device 22. The first and the second electronic device 20, 21 can be respectively a mobile phone, a computer, or a tablet computer.

The closed storage device 22 is externally provided with an operating unit 221 and a display 222, and internally provided with a microprocessor 223 and a security chip 224. The microprocessor 223 is electrically connected to the operating unit 221, the display 222 and the security chip 224; and the security chip 224 includes a processing unit 224a. Initially, the security chip 224 has not any public key stored thereon and is in an authorization state. Herein, the closed storage device 22 is an integrated circuit card (IC card).

Figure 3:
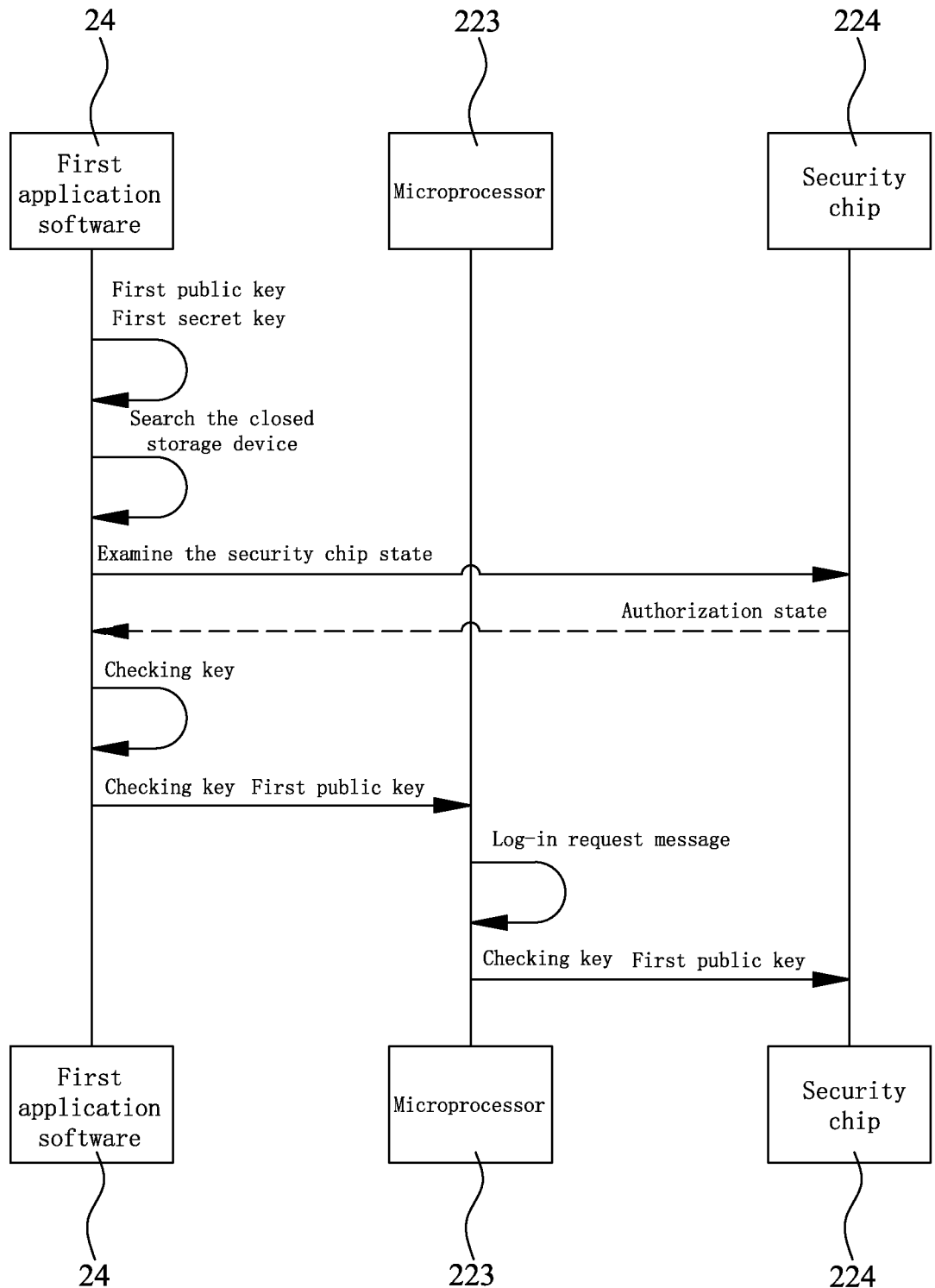
FIG. 3 shows procedures executed on a first electronic device according to the method of the present invention from a set-up step to a first log-in step.
Figure 4:
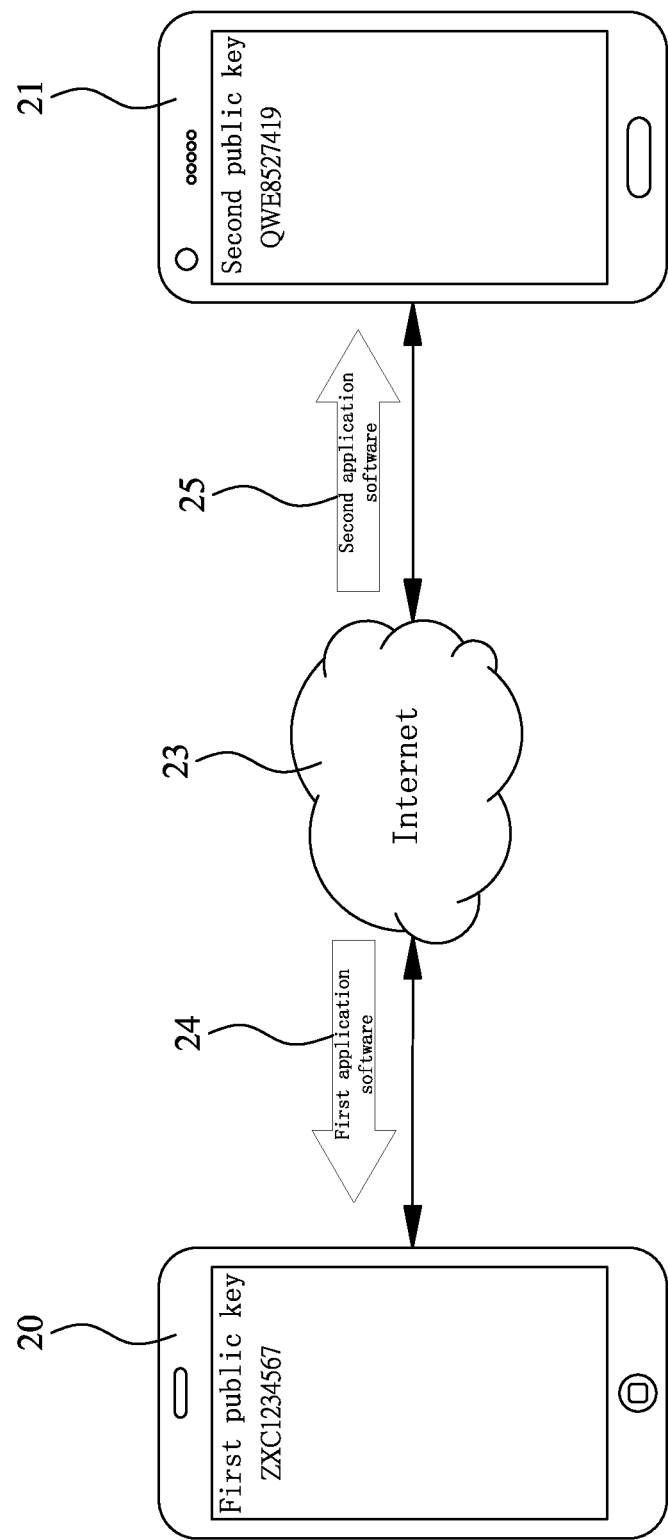
FIG. 4 is a conceptual view of the set-up step shown in FIG. 1.

Please refer to FIGS. 1, 3 and 4 at the same time. To perform pairing authentication among the first electronic device 20, the second electronic device 21 and the closed storage device 22 according to the method 1 of the present invention, in a set-up step S1, the first and the second electronic device 20, 21 are connected to the Internet 23, so that a piece of first application software 24 is downloaded and installed on the first electronic device 20, and a piece of second application software 25 identical to the first application software 24 is downloaded and installed on the second electronic device 21. After the first application software 24 has been installed on the first electronic device 20, a first public key and a corresponding first secret key are generated for the first electronic device 20; and the first public key will be shown on a display screen of the first electronic device 20. Similarly, after the second application software 25 has been installed on the second electronic device 21, a second public key and a corresponding second secret key are generated for the second electronic device 21; and the second public key will be shown on a display screen of the second a second electronic device 21. It is noted the second public key is different from the first public key and the second secret key is different from the first secret key. When the first public and secret keys and the second public and secret keys have been generated, the set-up step S1 is completed.

Figure 5:
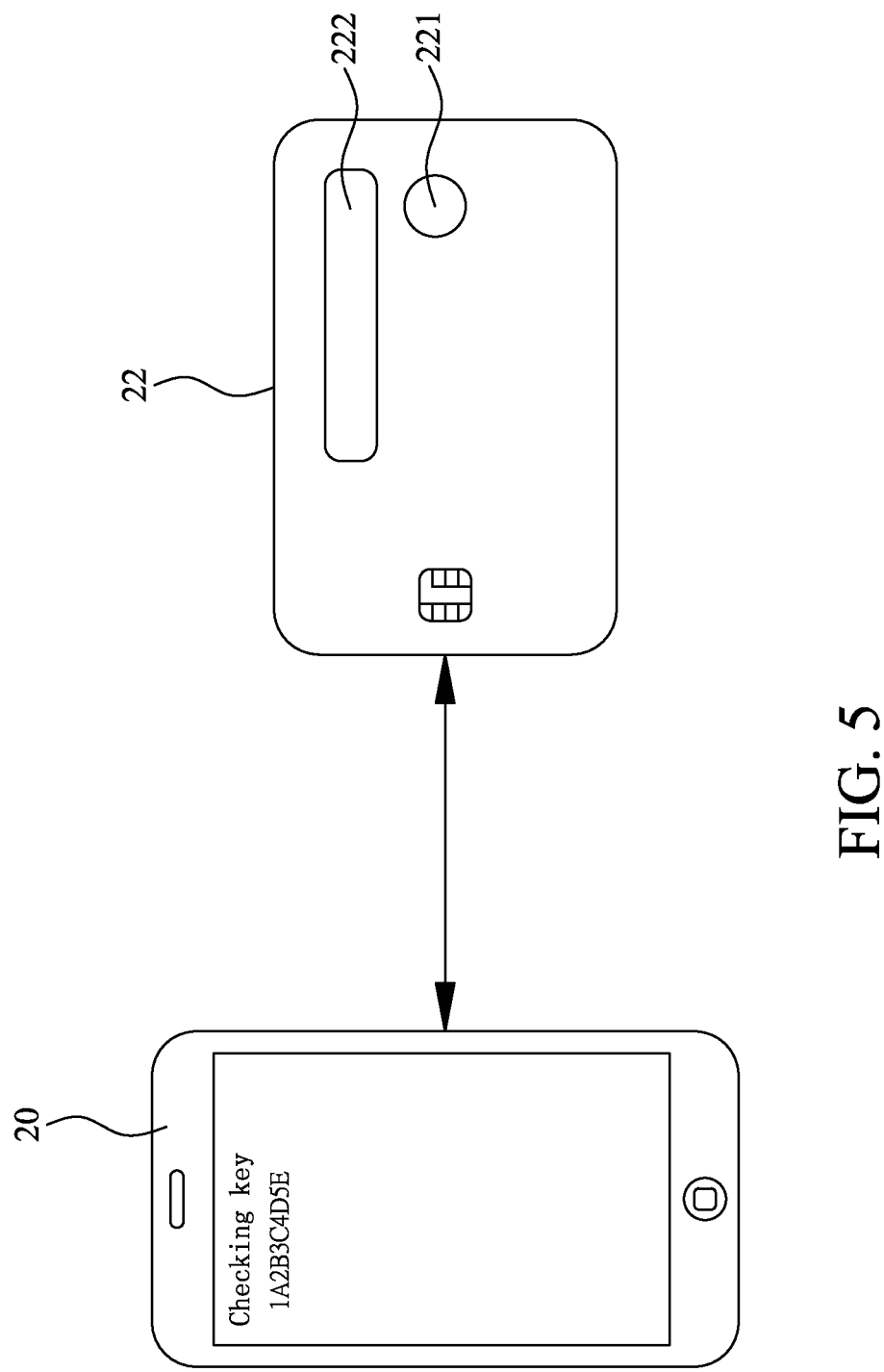
FIG. 5 is a conceptual view of a first connection step shown in FIG. 1.

Please refer to FIGS. 1, 3 and 5 at the same time. A first connection step S2 is performed after completion of the set-up step S1. In the first connection step S2, the first electronic device 20 searches the closed storage device 22 and transmits a first pairing request message to the latter. Since the security chip 224 of the closed storage device 22 is currently in the aforesaid authorization state, the closed storage device 22 can be directly connected to the first electronic device 20 in response to the first pairing request message. After the closed storage device 22 has been connected to the first electronic device 20, the first electronic device 20 starts examining the security chip 224 of the closed storage device 22 to thereby find the security chip 224 is currently in the authorization state. At this point, the first electronic device 20 generates a checking key.

Figure 6:
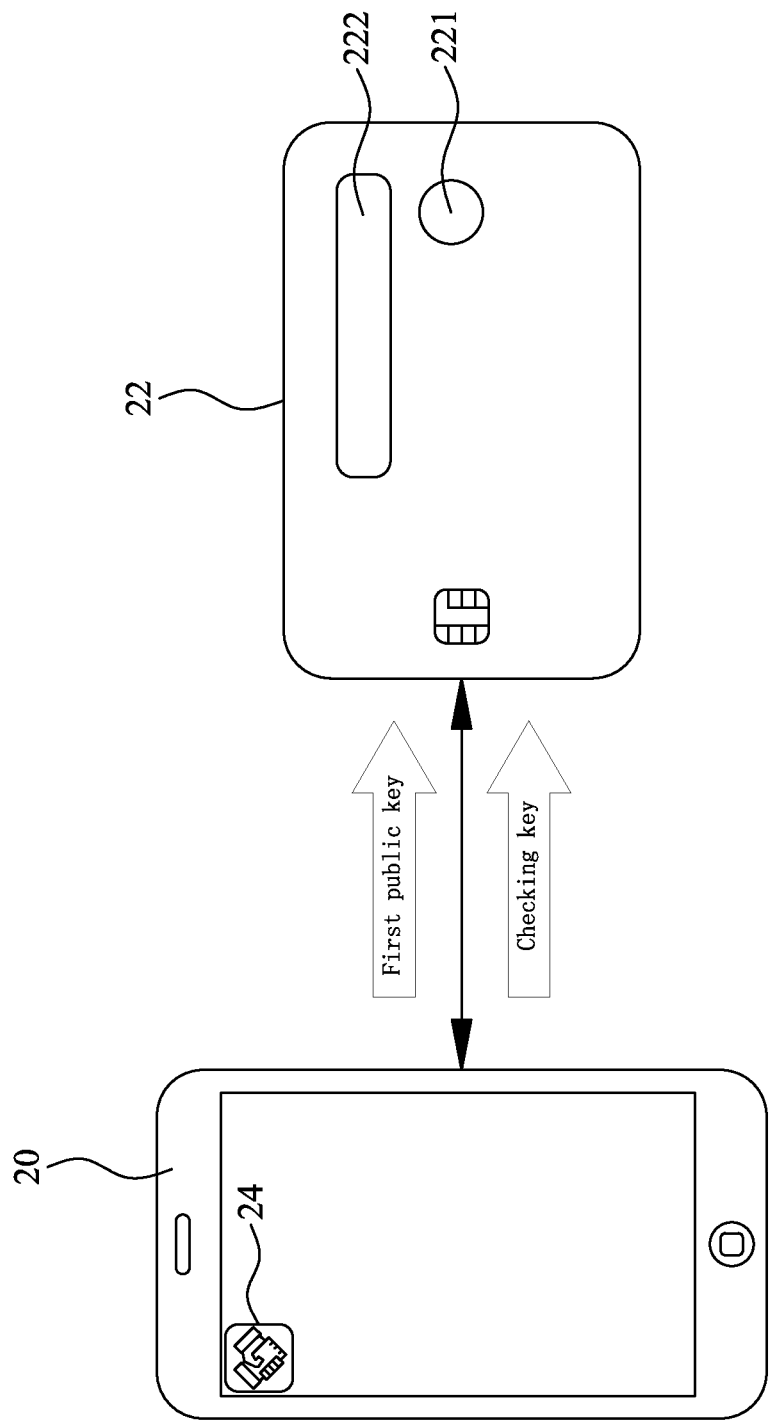
FIG. 6 is a conceptual view of the first log-in step shown in FIG. 1.

Please refer to FIGS. 1, 3 and 6 at the same time. A first log-in step S3 is performed after completion of the first connection step S2. In the first log-in step S3, the first electronic device 20 transmits the first public key and the checking key to the closed storage device 22. On receipt of the first public key and the checking key, the microprocessor 223 of the closed storage device 22 generates and transmits a log-in request message, which contains the first public key and the checking key, to the display 222 of the closed storage device 22, so that the first public key and the checking key are shown on the display 222.

A user who uses the first electronic device 20 can view the display 222 of the closed storage device 22 to confirm the first public key and the checking key match each other. Then, the user touches the operating unit 221 on the closed storage device 22 to generate and transmit an execution confirmation message to the microprocessor 223, so that the microprocessor 223 generates an execute log-in message according to the log-in request message and transmits the execute log-in message to the security chip 224, enabling the first public key and the checking key to be stored on the security chip 224 and changing the security chip 224 from the previous authorization state without any public key stored thereon into a restriction state having the first public key stored thereon. At this point, based on the first public key, the security chip 224 will generate a first identification message corresponding to the first application software 24, and the closed storage device 22 will transmit the first identification message to the first electronic device 20.

Figure 7:
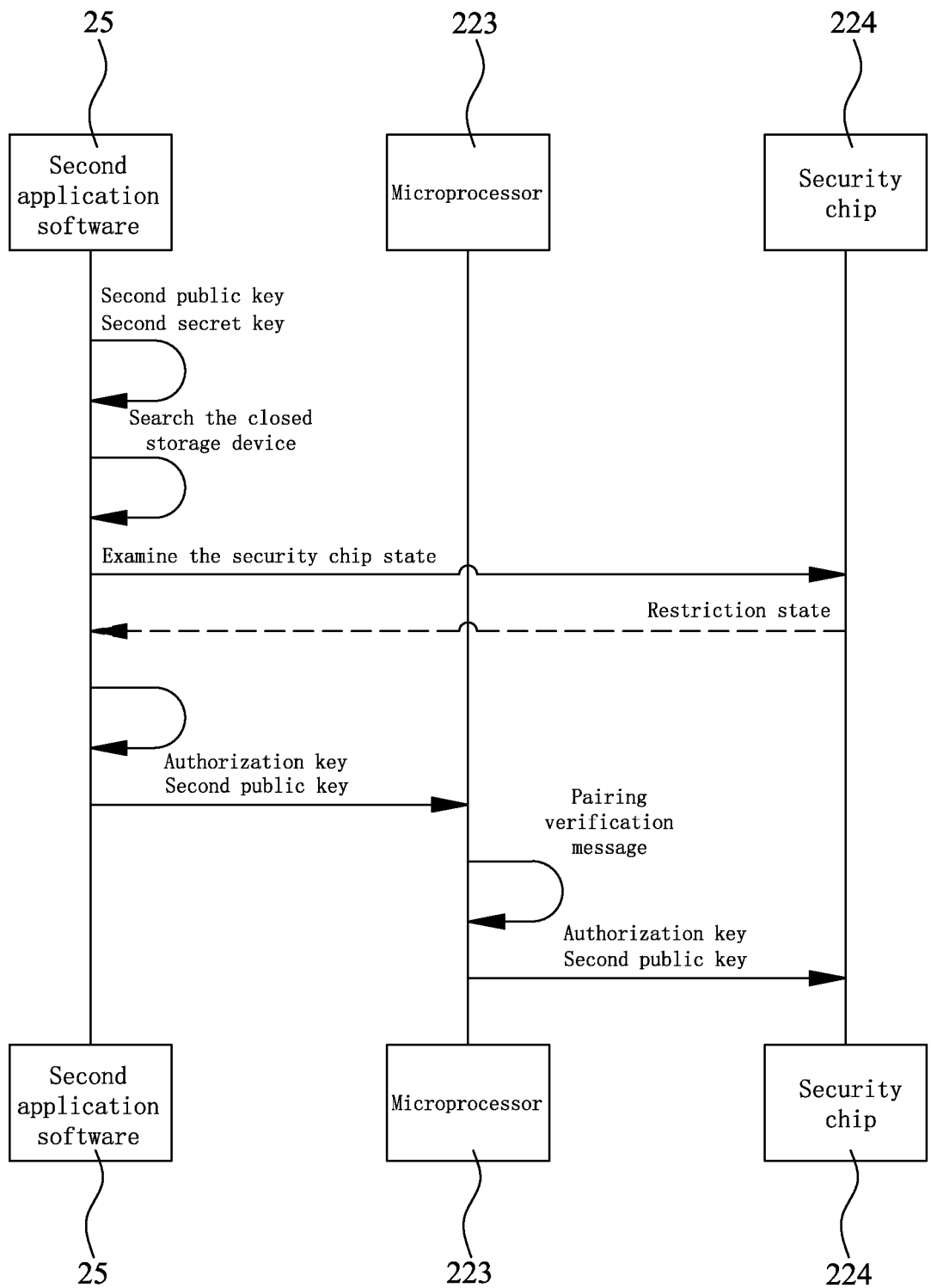
FIG. 7 shows procedures executed on a second electronic device according to the method of the present invention from a second connection step to a second log-in step.
Figure 8:
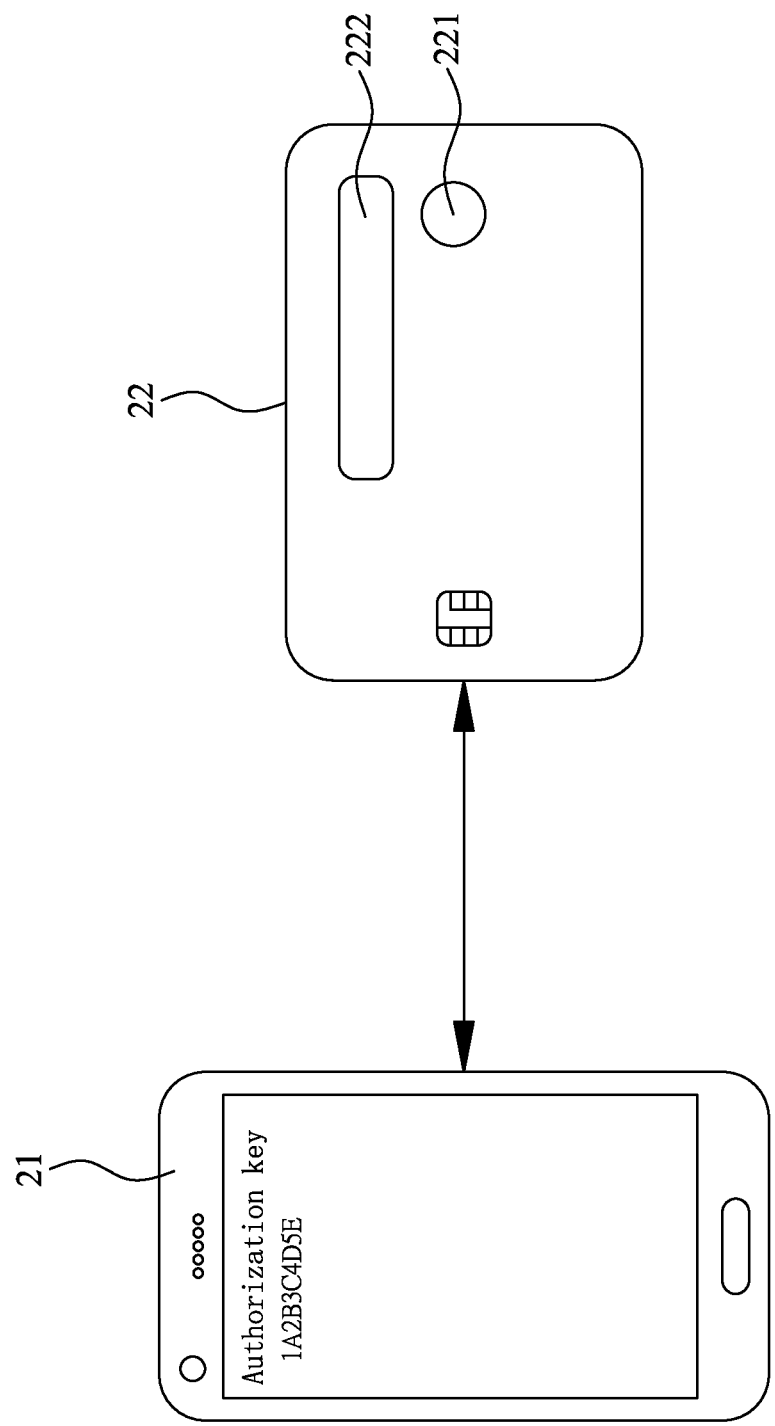
FIG. 8 is a conceptual view of the second connection step shown in FIG. 1.

Please refer to FIGS. 1, 7 and 8 at the same time. A second connection step S4 is performed after completion of the first log-in step S3. In the second connection step S4, the second electronic device 21 searches the closed storage device 22 and transmits a second pairing request message to the latter, so that the second electronic device 21 is connected to the closed storage device 22. At this point, the second electronic device 21 will examine the security chip 224 and verify the security chip 224 is in the restriction state. Meanwhile, the security chip 224 in the restriction state will generate and transmit a request message to the second electronic device 21. According to the request message, the second electronic device 21 obtains an authorization key input by the user. Then, the second electronic device 21 transmits the second public key and the authorization key to the closed storage device 22.

Figure 9:
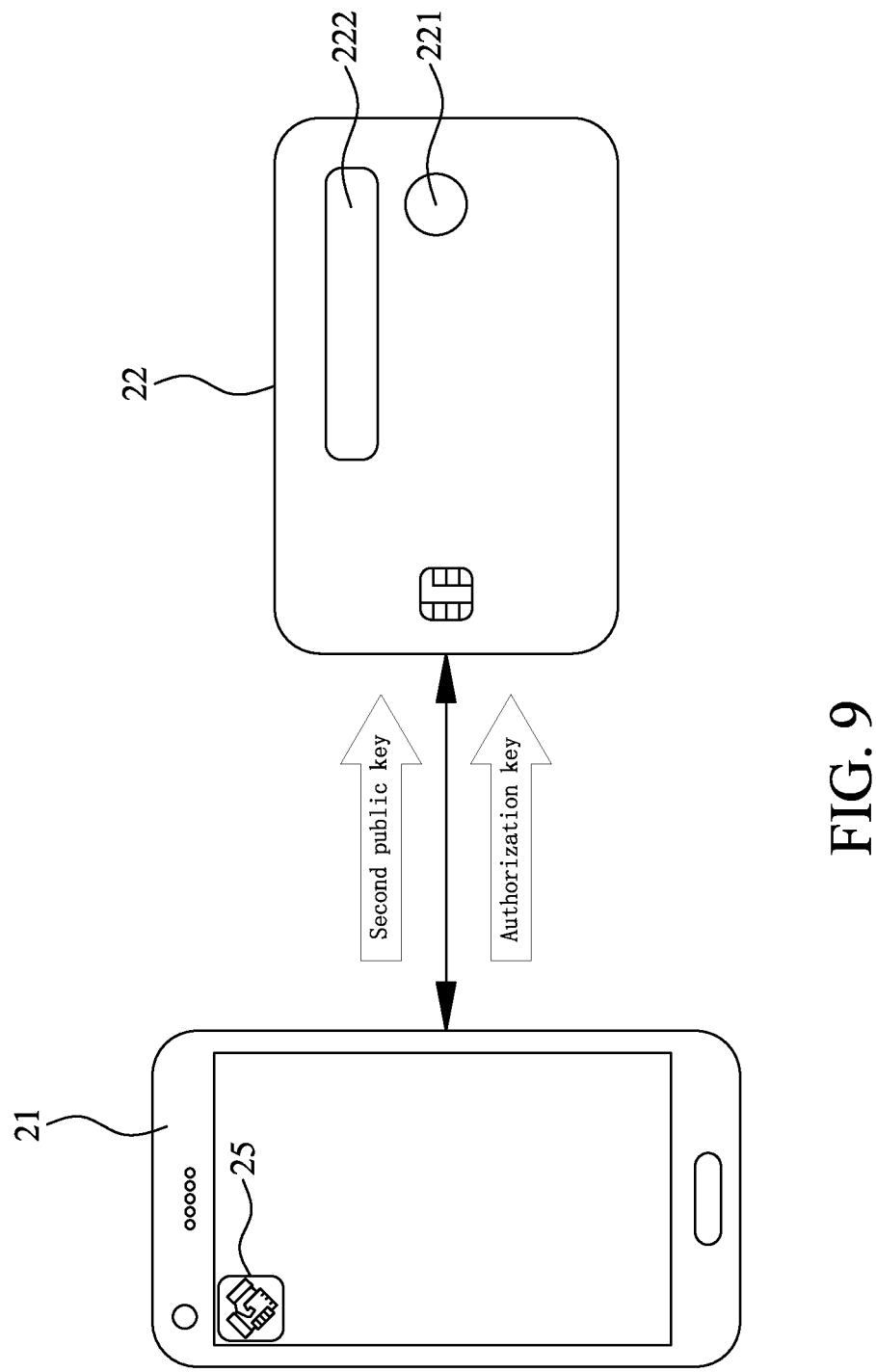
FIG. 9 is a conceptual view of the second log-in step shown in FIG. 1.

Please refer to FIGS. 1, 7 and 9 at the same time. A verification step S5 starts after the security chip 224 in the restriction state has received the second public key and the authorization key. In the verification step S5, the microprocessor 223 of the closed storage device 22 verifies the authorization key matches the checking key. At this point, the microprocessor 223 generates a pairing verification message that contains the authorization key and the checking key, and transmits the pairing verification message to the display 222 of the closed storage device 22, so that the authorization key and the checking key are shown on the display 222.

A user who uses the second electronic device 21 can view the display 222 of the closed storage device 22 to confirm the authorization key and the checking key match each other. Then, the user touches the operating unit 221 on the closed storage device 22 to generate and transmit an authorization confirmation message to the microprocessor 223, so that the microprocessor 223 generates an authorization consented message according to the pairing verification message and transmits the authorization consented message to the security chip 224. A second log-in step S6 starts when the security chip 224 receives the authorization consented message. In the second log-in step S6, the second public key is stored on the security chip 224, so that the security chip 224 has both of the first and the second public key stored thereon, allowing both of the first and the second electronic device 20, 21 to use the closed storage device 22. At this point, based on the second public key, the security chip 224 will generate a second identification message corresponding to the second application software 25, and the closed storage device 22 will transmit the second identification message to the second electronic device 21.

Figure 10:
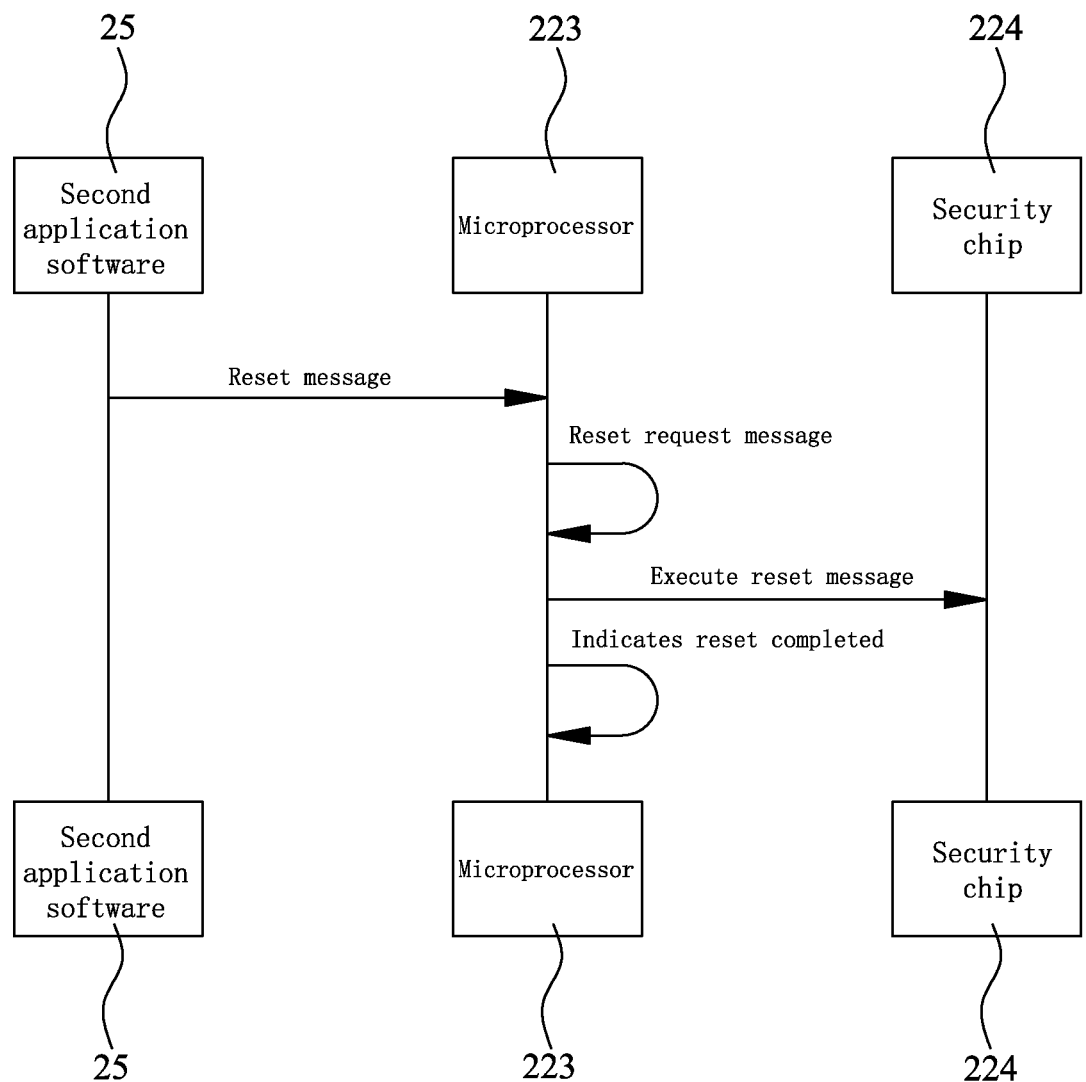
FIG. 10 shows procedures executed on the second electronic device according to a reset step of the method of the present invention.
Figure 11:
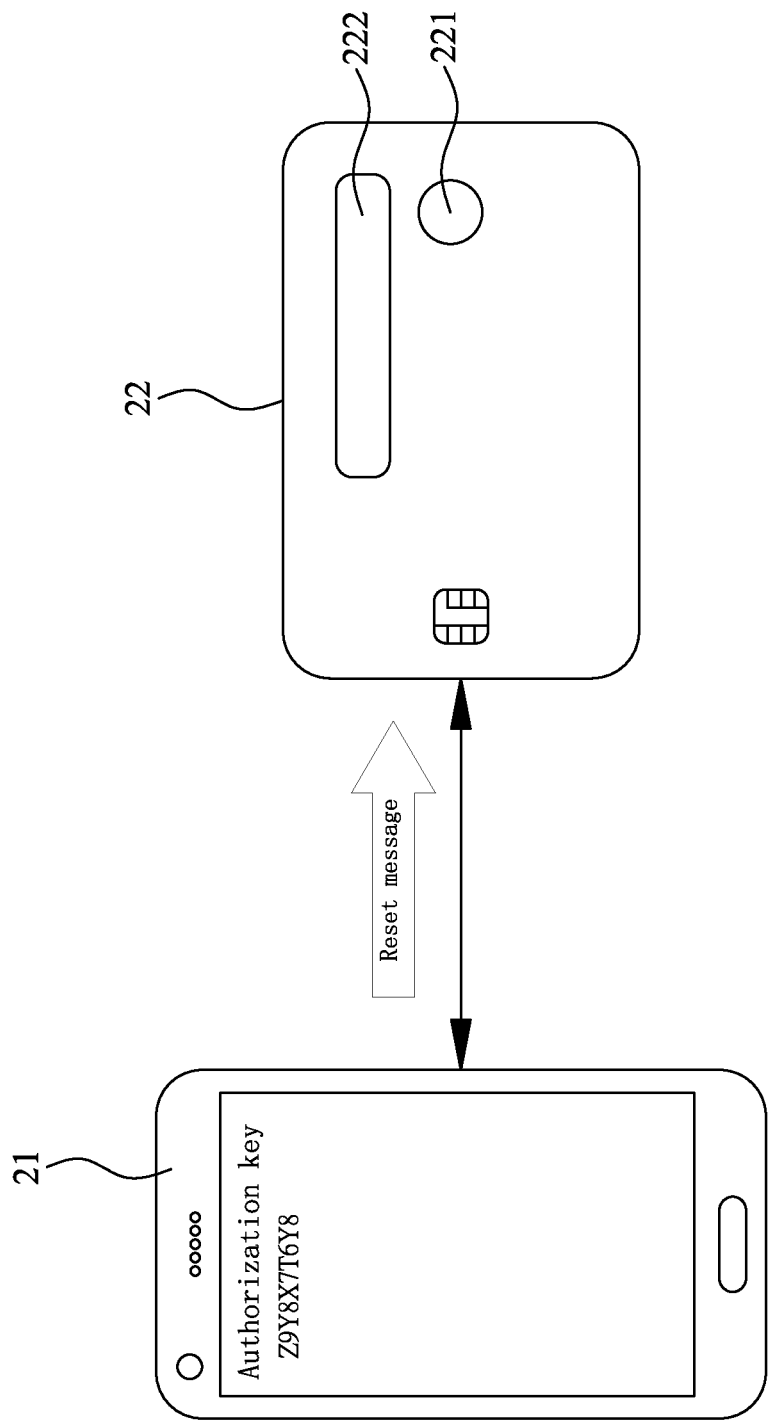
FIG. 11 is a conceptual view of the reset step shown in FIG. 1.

Please refer to FIGS. 1, 10 and 11 at the same time. In the event the microprocessor 223 of the closed storage device 22 finds in the verification step S5 that the authorization key does not match the checking key, the security chip 224 will refuse to store the second public key on it. At this point, a reset step S7 can be started. Since the authorization key transmitted by the second electronic device 21 does not match the checking key, the second electronic device 21 is not allowed to use the closed storage device 22. At this point, a reset message can be generated by the second electronic device 21 via the second application software 25 installed thereon and transmitted to the closed storage device 22 for the microprocessor 223 thereof to generate a reset request message according to the reset message. The reset request message is shown on the display 222 of the closed storage device 22 for the user of the second electronic device 21 to view. When the user confirms the request for resetting the security chip 224, the user can push the operating unit 221 of the closed storage device 22 for the operating unit 221 to generate a reset confirmation message and transmit the same to the microprocessor 223. At this point, the microprocessor 223 generates an execute reset message according to the reset request message and transmits the execute reset message to the security chip 224, so that the security chip 224 is changed from the restriction state into the authorization state again and has not any public key stored thereon.

On the other hand, in the event the user of the second electronic device 21 has no intention to change the security chip 224 into the authorization state again, the user can choose not to push the operating unit 221 on the closed storage device 22. In this case, no execute reset message will be generated by the operating unit 221 and the security chip 224 is still in the restriction state. It is understood the above description of the generation of the reset message by the second application software of the second electronic device 21 is only illustrative to facilitate easy explanation of the present invention. In other words, the reset message can be otherwise generated by the first electronic device 20 via the first application software 24 installed thereon.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A pairing authentication method for electronic transaction device, comprising the following steps:

installing a piece of application software on a first and a second electronic device, so that a first public key and a second public key are generated for the first and the second electronic device, respectively;

causing the first electronic device to search a closed storage device and establish a connection to the closed storage device; further causing the first electronic device to examine a security chip of the closed storage device to verify that the security chip is currently in an authorization state and has not any public key stored thereon; and then causing the first electronic device to generate a checking key;

causing the first electronic device to transmit the first public key and the checking key to the closed storage device for storing on the security chip, so that the security chip is changed from the authorization state into a restriction state having a public key stored thereon when the first public key and the checking key have been stored thereon;

causing the second electronic device to search the closed storage device and establish a connection to the closed storage device; further causing the second electronic device to examine the security chip and verify the security chip is currently in the restriction state; and then causing the security chip to generate and transmit a request message to the second electronic device;

according to the request message, the second electronic device obtaining an authorization key and transmitting the second public key and the authorization key to the closed storage device; and the closed storage device storing the second public key thereon when it verifies the authorization key matches the checking key.

2. The pairing authentication method for electronic transaction device as claimed in claim 1, further comprising the following steps:

a microprocessor of the closed storage device generating a log-in request message when the closed storage device receives the first public key and the checking key;

an operating unit of the closed storage device then generating and transmitting an execution confirmation message to the microprocessor; and the microprocessor generating an execute log-in message according to the log-in request message for the security chip to store the first public key and the checking key thereon.

3. The pairing authentication method for electronic transaction device as claimed in claim 1, further comprising the following steps:

a microprocessor of the closed storage device generating a pairing verification message before the closed storage device starts verifying the authorization key matches the checking key;

an operating unit on the closed storage device generating and transmitting an authorization confirmation message to the microprocessor; and the microprocessor generating an authorization consented message according to the pairing verification message and transmitting the authorization consented message to the security chip to complete the verifying of the authorization key and the checking key by the closed storage device.

4. The pairing authentication method for electronic transaction device as claimed in claim 1, further comprising the following steps:

according to the first public key, the security chip generating a first identification message corresponding to the application software installed on the first electronic device after the first public key is stored on the security chip, and the closed storage device transmitting the first identification message to the first electronic device; and according to the second public key, the security chip generating a second identification message corresponding to the application software installed on the second electronic device after the second public key is stored on the security chip, and the closed storage device transmitting the second identification message to the second electronic device.

5. The pairing authentication method for electronic transaction device as claimed in claim 1, further comprising the following step:

the security chip refusing to store the second public key thereon when the closed storage device verifies the authorization key does not match the checking key.

6. The pairing authentication method for electronic transaction device as claimed in claim 1, further comprising the following steps:

one of the first and the second electronic device generating a reset message via the application software installed thereon and transmitting the reset message to the closed storage device to change the security chip from the restriction state into the authorization state again.

7. The pairing authentication method for electronic transaction device as claimed in claim 6, further comprising the following steps before the security chip is changed from the restriction state into the authorization state again:

a microprocessor of the closed storage device generating a reset request message according to the reset message;

an operating unit on the closed storage device generating and transmitting a reset confirmation message to the microprocessor; and the microprocessor generating an execute reset message according to the reset request message and transmitting the execute reset message to the security chip, enabling the security chip to change from the restriction state to the authorization state again.

* * * * *